Figure 1:
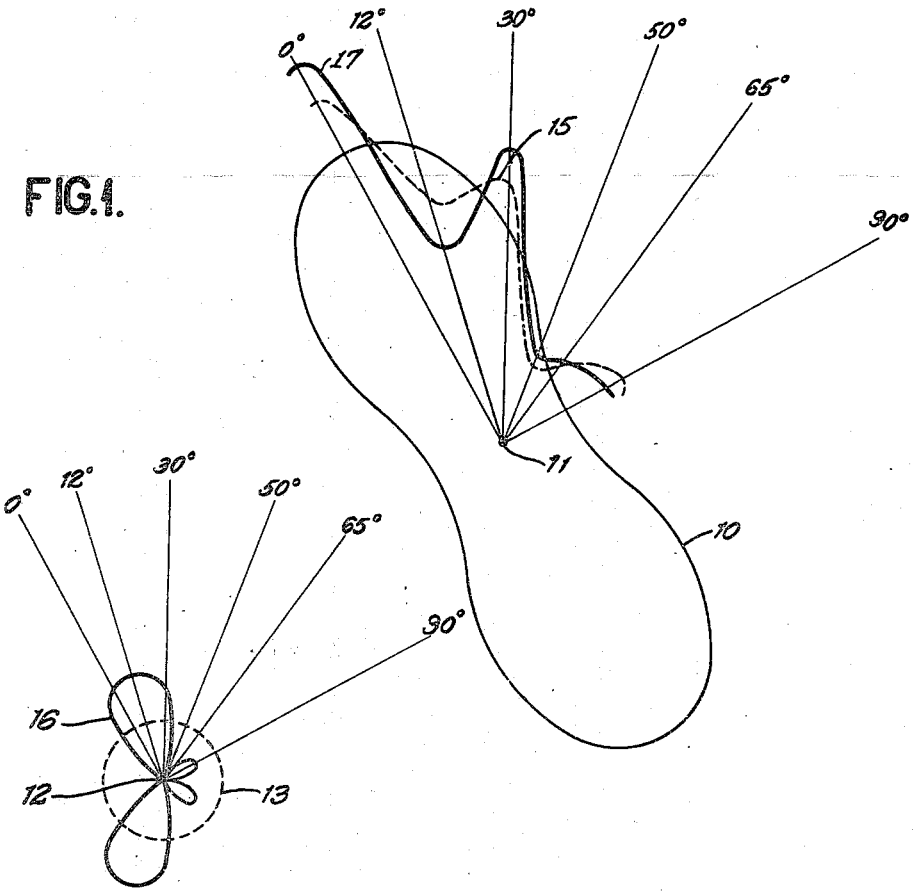

Sept. 3, 1946.  A. ALFORD  2,406,734
GLIDE PATH BEACON
Filed Feb. 1, 1940  3 Sheets-Sheet 1

INVENTOR.
ANDREW ALFORD
BY
ATTORNEY.

Sept. 3, 1946.   A. ALFORD   2,406,734
GLIDE PATH BEACON
Filed Feb. 1, 1940   3 Sheets-Sheet 2
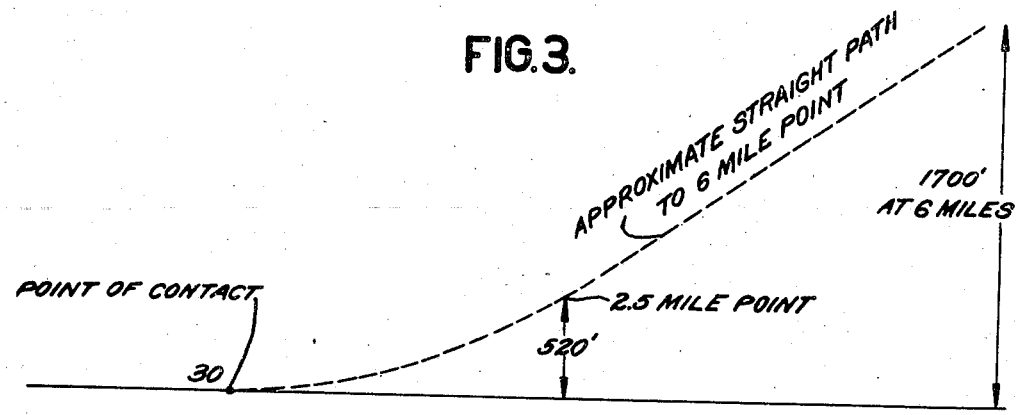
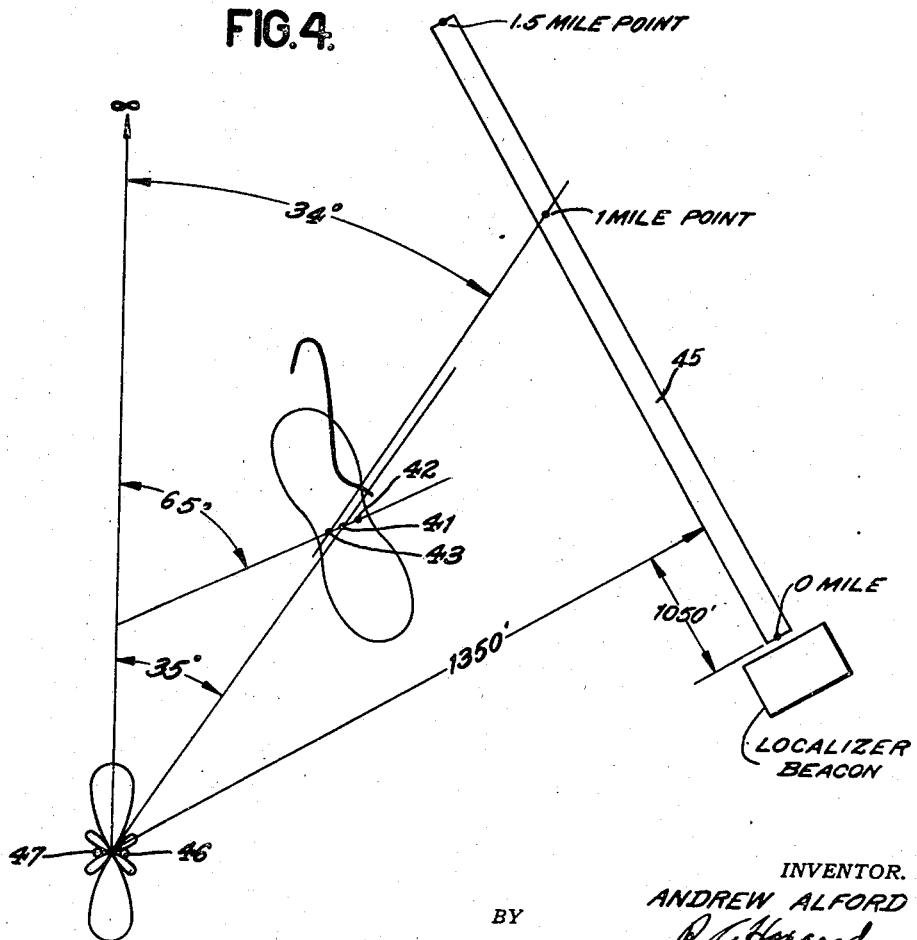
INVENTOR.
ANDREW ALFORD
BY R. C. Hopgood
ATTORNEY.

Sept. 3, 1946.  A. ALFORD  2,406,734
GLIDE PATH BEACON
Filed Feb. 1, 1940  3 Sheets-Sheet 3
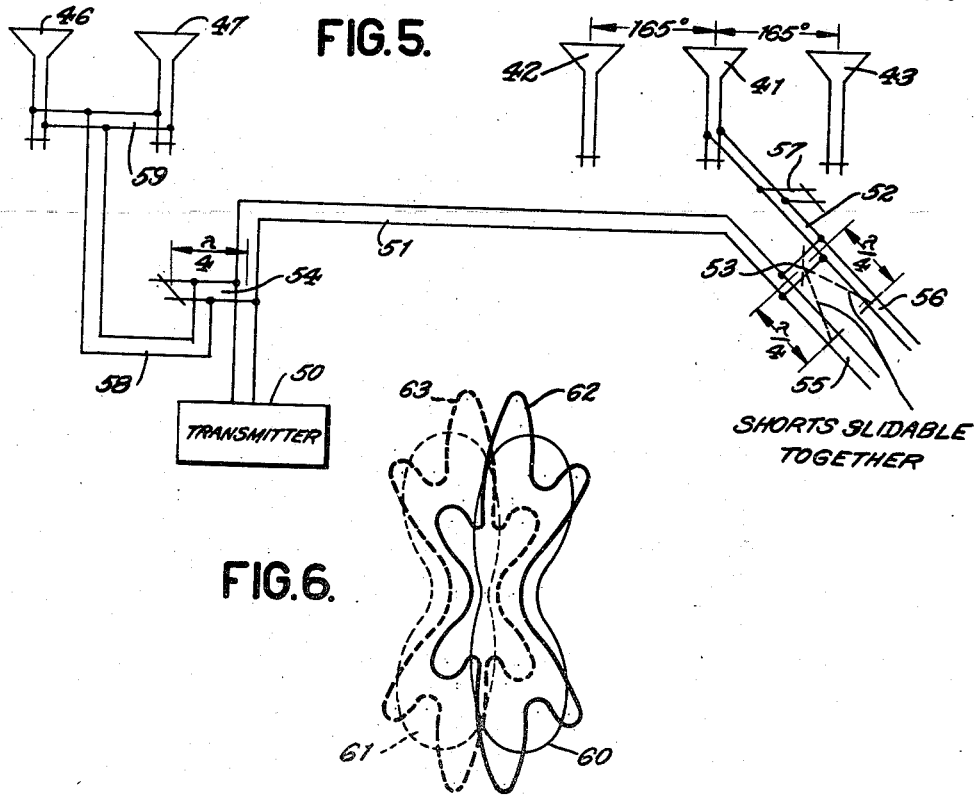
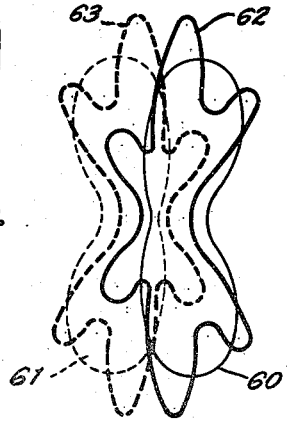
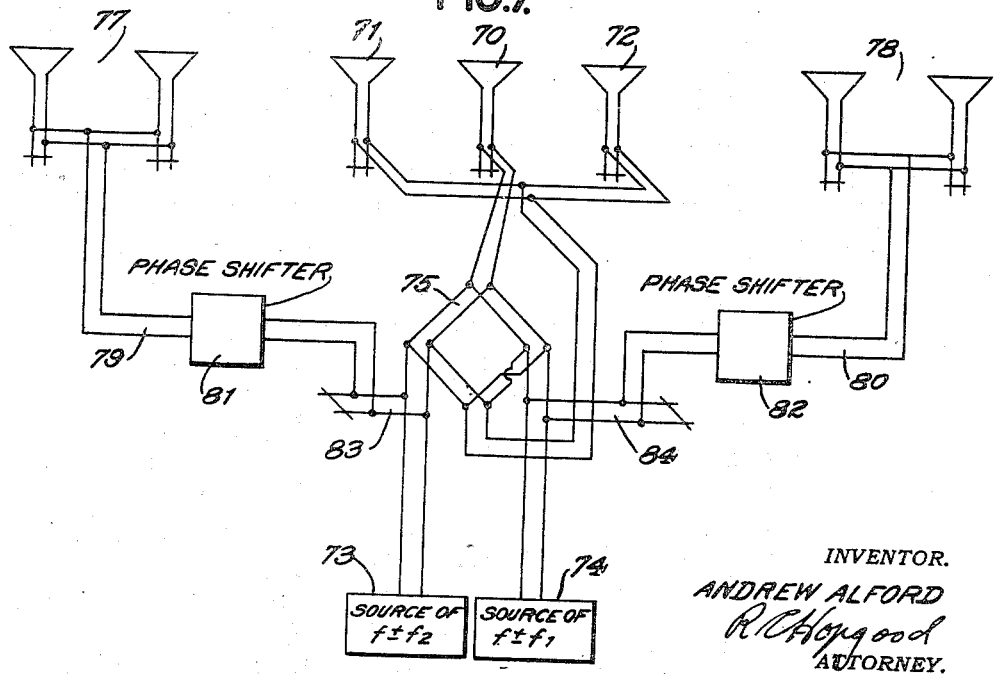
INVENTOR.
ANDREW ALFORD
ATTORNEY.

Patented Sept. 3, 1946

2,406,734

UNITED STATES PATENT OFFICE 2,406,734

GLIDE PATH BEACON

Andrew Alford, New York, N. Y., assignor to Federal Telephone & Radio Corporation, a corporation of Delaware Application February 1, 1940, Serial No. 316,732

12 Claims. (Cl. 250—11)

My invention relates generally to systems for producing a modified radiation diagram and more particularly to arrangements for modifying the radiation pattern of a radiator by superposing on it relatively weak radiations from a separate source.

It is known that many forms of radiation patterns may be achieved by using arrays of different antennae and by choosing the phase relations of these antennae so as to obtain addition or cancellation of energy in different directions. In such arrays the various units are generally energized directly or by parasitic radiation with energy of the same order of magnitude.

In accordance with my invention and as a principal object thereof, the energy distribution of a radiated pattern is varied by superposing on the principal radiation pattern energy of a smaller order of magnitude from an auxiliary radiator. Either or both of the radiation patterns may be directive and the phase relation magnitude of the energy supplied to the radiators, and the relative spacing thereof may be chosen at will to provide the desired radiation pattern form.

This modification of the radiation pattern or distribution of energy has many uses, and as an example may be applied to produce a radiation pattern having a sharp curvature suitable for use to form a desired constant intensity landing curve for aircraft, or to form a sharply defined course guiding system.

In previous glide path landing systems utilization has been made of the principle of constant field intensity defined by a radiated wave for producing a glide path for guiding an aircraft to a landing point. One type of this arrangement utilizes a club-shaped radiation diagram and brings the aircraft to landing substantially at the point of location of the transmitter. One of the principal difficulties with this type of glide path beacon resides in the fact that the landing line is curved throughout its entire length resulting in a path which descends too steeply at the greater distance from the airport and becomes too flat near the landing point so that unnecessarily high landing speeds are required.

To overcome this difficulty it has previously been proposed to utilize a glide path beacon having a non-uniform field distribution and to guide the airplane along a course across this non-uniform radiation pattern at an angle with respect to the axis of symmetry thereof. This proposed system produces a straight line glide path, the angle of which may be made proper for the landing of a craft from a considerable distance. However, this system also is not found to be entirely satisfactory, since the rate of descent of the airplane is unduly high at the time when the airplane lands, resulting in a high shock when the airplane contacts the ground.

The ideal landing curve or glide path for an aircraft, therefore, should be substantially a straight line descent for a considerable distance until the aircraft closely approaches the ground at which time the path should descend less steeply so that the rate of descent will not be so high as to cause undue shock and strain in the airplane upon contacting the earth. In accordance with my invention I provide a constant intensity glide path arrangement having this desirable characteristic.

Furthermore, in this system the beacons producing the radiation diagram forming the glide path are spaced from the landing runway and therefore overcome the difficulty which may be caused by the antenna structure at the gliding beacon protruding from the earth's surface and endangering the aircraft during landing.

It is a further object of my invention to provide a constant intensity glide path system which will have substantially a straight line portion remote from the landing field and will have a curved portion in the region adjacent the landing field so that an aircraft may land along the beam without subjecting the craft to undue landing impact.

It is a still further object of my invention to provide a controllable arrangement for varying the shape of the glide path so as to secure the desired landing curve.

In accordance with a feature of my invention I provide a main glide path beacon or radiator having a directive characteristic pattern and with this main beacon to modify the radiation field pattern so as to provide the desired landing curve in accordance with the general principles outlined above.

In a known form of guiding beacon signals are transmitted on either side of a course line preferably in overlapping relation. The zone of overlap may then be used to define a beacon course.

It is generally desirable in such guiding beacons that the course indicated be as sharp as possible so that the craft will be advised of small departures from the course. It is accordingly a further object of my invention to provide a course beacon wherein the course is defined by radiation patterns so shaped as to produce a sharply defined guiding course indication.

This may be accomplished in accordance with the teachings of my invention by using auxiliary radiators spaced from the main beacon radiators and energized with a considerably lower power than the main radiator, modulated with the signal frequency. Two of these auxiliary radiators may be used each modulated with the corresponding signals to form the desired resultant patterns for the two sides of the course.

Figure 2:
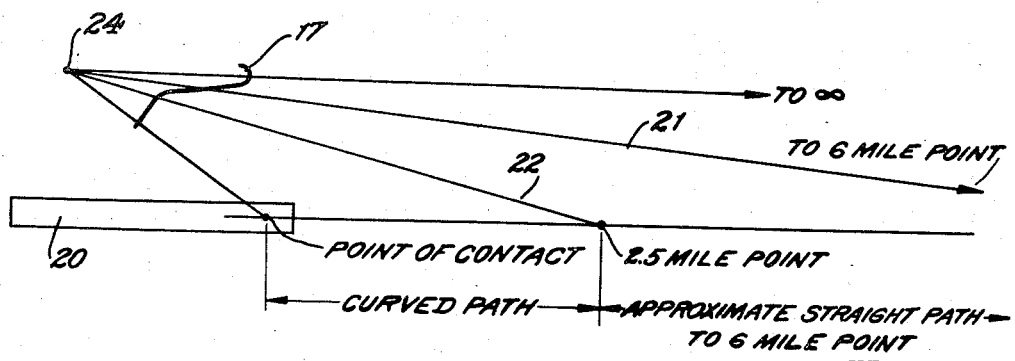

Other objects and advantages will be apparent from the particular description of my invention made in connection with the accompanying drawings in which:

Fig. 1 illustrates by way of example how a principal radiation pattern may be modified by addition of the energy of a smaller radiation pattern, Figs. 2 and 3 illustrate a landing beacon system in plan view and elevation, respectively, for producing a desired landing curve, Fig. 4 diagrammatically illustrates a particular beacon installation, Fig. 5 is an illustration of an antenna arrangement suitable for producing the radiation patterns shown in Fig. 3, Fig. 6 shows a field pattern arrangement for a two course or localizer beacon, and Fig. 7 illustrates a wiring arrangement of a beacon arrangement for producing a pattern such as shown in Fig. 6.

The principles of my invention may best be gathered in a reference to Fig. 1, in which a principal radiation pattern 10 having a center of radiation 11 is shown, the pattern having a general directional characteristic of elongated form. It should be understood that this shape is shown merely by way of example since any desired pattern form may be used for the basic or principal radiation.

From a point 12 spaced from point 11 a distance dependent upon the effect desired is transmitted another energy wave. In the first instance it will be assumed that the radiation from auxiliary radiator 12 is omnidirectional, the pattern being shown in broken lines at 13. At a distance sufficiently great from transmitters 11 and 12, the energy of the two patterns adds in accordance with the angular relationship thereof since the two patterns may be regarded as originating at a single point. This is shown diagrammatically in Fig. 1. It may be assumed that in the line marked 0°, the energy at the measuring point is in phase and adds, and that at the 12° angle the energy from pattern 13 is in phase opposition with that of pattern 10 so as to subtract and that they will again add at 30°. This cycle of addition and subtraction may repeat again at 30°, 50° and 90°, as shown in the drawings. It is clear that the angles at which addition and subtraction occur will vary as progress is made about the radiators due to their spacing. Thus the radiation from the weaker pattern superposes a wave on the principal pattern 10, producing a resultant pattern 15 shown by broken lines. A variation of phase relationship of the energy between 11 and 12 will serve to change the angles at which the energy adds and subtracts producing in effect a rotation or movement of the additional or ripple wave about the center 11. Similarly, a variation in the magnitude of the energy radiated from 12 will merely vary the amplitude of the ripple without changing its essential characteristics.

It can be seen, however, that by varying the shape of the auxiliary radiation diagram, a variation in the resultant pattern different from that formed merely by a phase shift in the energization may be accomplished. By adjusting radiator 12 so as to produce a directive pattern in the form shown at 16 by the heavy black lines, and with the phasing still maintained so that the patterns will add and subtract in the same directions as previously considered, a resultant pattern 17 shown also in heavy black lines, may be obtained. It should be noted that this new resultant pattern does not have the large hump at the 90° angle as in the case of pattern 15, but instead at this point substantially no change is made in the original pattern so that the added wave or ripple produces a resultant pattern wherein the energy is very strong in the 30° angle and reduces sharply from that value to a minimum at 50° and then changes its ratio of variation in value between the 50° and 65° angles so as to produce a less sharply defined change. This particular curve of energization produces a radiation pattern which may be quite useful for certain purposes. It is clear, however, that should other patterns be desired, different variations may be achieved by utilizing different directive patterns either for the main radiation 10 or for the auxiliary radiation from radiator 12. Also, the shape of the pattern can be varied by adjusting the phase relationship between the two radiators since then the maximum addition may occur at minimum points in the principal radiation pattern.

The auxiliary radiator 12 is preferably a fed radiator since in such an arrangement it is easier to adjust the energy and phase relationship. However, a parasitically energized radiator such as a screen may also be used if desired. Such a screen should be placed at the desired distance and shaped to produce the required modification. Furthermore the reradiating screen should not be so close to the main radiator as to be coupled thereto.

To achieve the desired modification of the pattern the power supplied the auxiliary radiator should be small with respect to that supplied to the principal radiator. That is, the ratio should be in the order of 1:10 to 1:50 so that the effect is that of adding a relatively small ripple or wavelet to the main radiation pattern. Also, the spacing between the main and auxiliary systems is made quite large, for example, at least a wavelength, and preferably a distance of several wavelengths so that direct coupling will not occur. The desired effect is not dependent upon the spacing being an integral number of wavelengths but merely on the relative length spacing.

Many applications of this arrangement for varying the shape of the radiation diagram may occur to one skilled in the art. One particular use of a system utilizing the principles outlined above, is the provision of a radiation pattern for producing a desired glide path landing curve. As outlined previously in the specification, the most desirable landing curve is one wherein the plane descends at a constant rate or in a straight line glide path for a considerable distance and then descends at a lower rate on a curved glide path just previous to landing. In general the straight line portion of the glide path should drop at an angle of approximately 3°. Such a landing curve may be obtained by utilizing a radiation diagram having substantially the curvature of the portion of curve 17 shown in Fig. 1 between the 30° and 60° line. In Figs. 2 and 3 such an arrangement is diagrammatically illustrated.

Curve 17 of Fig. 2 has a curvature substantially coinciding with a portion of the curve 17 of Fig. 1. The beacon is arranged with respect to the glide path so as to have a maximum radiation substantially parallel with the runway 20. Thus, this portion will not intersect the landing line except at infinity. The landing runway 20, as shown in Fig. 2, is substantially one mile in length and the center of radiation is spaced to one side of the runway a distance of approximately 1500'. It can be seen that at a particular angle indicated by line 21, the landing line of the craft will be intersected at substantially the six mile point. This dimension is given merely by way of example, since it is clear that other distances and values may be utilized merely by changing the spacing of the beacon with respect to the runway or by other adjustments. From this six mile point designated by the intersection of line 21 and the landing line to a point determined by the intersection of line 22 and the course of the vehicle, the radiation strength of pattern 17 falls away quite rapidly so that as the craft approaches along this distance guided in altitude by a constant intensity signal obtained from the under surface of the radiation pattern 17, the line followed will descend in substantially a straight line.

As the aircraft approaches the transmitter 24 which produces the resultant diagram 17, the signal energy received tends to increase due to the decrease in the distance from the transmitter. The craft must then be guided to a lower altitude to maintain constant intensity of the received signal. This increase in energy may be in part offset by the decrease in the radiation toward the craft, since as the craft approaches the landing runway the angle with respect to the radiator varies. By proper control of radiation strength this energy off-set may produce a substantially straight constant intensity glide path over this portion of the course. Beyond the point determined by the intersection of line 22 and the craft course line, the decrease in energy due to the distribution curve may be much less or may even increase due to the change in angular position so that in order to maintain constant amplitude of signals the craft must descend at a different rate to maintain the signal intensity constant. At this point the rate of approach of the craft to the transmitter is greatly reduced due to the fact that the craft is approaching a line at right angles to the radiator itself, so that the increase in energy due to approaching the beacon no longer plays so large a part. Thus for this portion, the resultant energy increase is very small and the rate of descent is relatively low, so that the craft is traveling in a direction nearly parallel with the earth's surface at the point of contact.

In order that the path defined by the beacon may be of the nature described, that is, straight line at distance points and curved near the point of approach, it is merely necessary to arrange the radiator so that the radiation pattern as viewed in the horizontal plane has the desired shape, as shown at 17. It should be borne in mind that at the same time the radiation pattern in the vertical plane tends to be curved with respect to the surface of the earth because of the usual effect of the distribution in the vertical plane due to earth reflections of the energy.

In Fig. 3 is illustrated a curve which may be produced by a radiator such as 24, shown in Fig. 2. In this figure it is clear that the path of the aircraft from the point of contact 30 to a distance of approximately two and a half miles varies in a curved fashion so that at the two and a half mile point the elevation of the craft is approximately 520'. From this point onward to the six mile point the landing curve follows substantially a straight line of such a value that at six miles from the contact point the elevation is in the order of 1700'. It is clear that any type of curvature may be produced merely by properly shaping the radiation pattern produced at radiator 24 so as to achieve the desired energy relationship received on the craft.

In Fig. 4 is shown in greater detail a beacon arrangement patterned after an actual installation wherein the desired curvature of landing path was produced. In this figure, however, the landing line is shown angularly related with respect to the radiation pattern for the purpose of more clearly illustrating the arrangement although the landing path is actually substantially parallel thereto as shown in Fig. 2. The principal radiation pattern is produced by a radiator assembly comprising a central radiator 41 and two parasitic radiators 42, 43 arranged on either side thereof. The system was operated at about 93.9 mc. and the parasitic radiators 42, 43 were spaced on either side of main radiator 41 a distance of about 165 electrical degrees. The auxiliary radiator consisted of two radiating elements 46, 47 spaced apart a distance of from 160° to 280° electrically. The spacing between the main radiator and the auxiliary radiator was about five wavelengths, 52 feet, at the operating frequency, and these radiators were so arranged that the line through the centers of the two radiators was displaced approximately 35° from the direction parallel with the runway corresponding to the principal direction of radiation of the auxiliary radiator. The main radiator was so arranged that the line defined by the elements thereof made an angle of substantially 65° with the landing runway. This auxiliary radiator was spaced laterally at a distance of about 135 wavelengths from the landing runway 45. The system was also spaced about ten wavelengths from the near end of the landing runway and the system was arranged so that the point of contact for the aircraft was substantially at the far end of the runway which was made about one mile in length. The auxiliary radiator comprised two elements 46, 47 energized substantially in phase and spaced apart so as to produce a suitable multi-lobe radiation. The power radiated from the auxiliary radiator was in the order of $1/36$ of the power radiated from the main radiator. With this system the point of contact was formed at an angle of approximately 34° from the direction of maximum radiation with respect to the radiation patterns and the point at which landing was commenced, that is, the point of which the straight line glide path beacon was approximately one and one-half miles from the point of contact and extended outwardly to a distance of approximately six miles at which point the elevation of the aircraft was approximately 1700'. It was found that this arrangement produced a very good glide path for landing of aircraft following substantially a straight line from a point six miles distant from the runway to a point about a mile and a half therefrom, and that from the one and a half mile point to the point of contact the curvature gradually decreased so that the aircraft was brought to landing from an altitude of approximately 520' to ground in this one and a half mile distance.

The exact phase relationship between the main radiator 41 and radiators 46 and 47 was not measured but adjustment was made until the desired curvature was achieved.

In Fig. 5 is illustrated a typical antenna arrangement for producing a glide path in accordance with the illustration shown in Figs. 2, 3 and 4. The main radiator comprises the energized radiator 41 and two auxiliary radiators 42, 43. Each of these radiators, as well as the other radiators of the system are shown diagrammatically as antenna units or horizontal loops of the type described in detail in my copending application No. 270,173, filed April 26, 1939, and produce substantially pure horizontally polarized waves. The energy for producing the glide path is produced in transmitter 50 and carried over lines 51. A second branch line 52 is provided connected directly to radiator 41 and lines 51 and 52 are interconnected by a pair of short circuiting bars 53. Bridged across transmission line 51 is provided a short circuited quarter wavelength section of transmission line 54 and across a point near one end of this section is connected line 58 which serves to energize auxiliary radiators 46, 47. By adjusting the position of short circuiting bars 53, the phase relationship of the energy supplied to antenna 41 and auxiliary radiators 46, 47, may be easily adjusted.

Across each of transmission lines 51, 52, at a point substantially a quarter of a wavelength from the connection point of bars 53 are provided short circuiting bars 55, 56. These short circuiting bars at a quarter wavelength distance produce an impedance which is substantially infinite at the working frequency so that adjustment of bars 53 does not vary the impedance of the transmission line. Preferably, bars 53, 55 and 56 are interconnected for simultaneous movement, as indicated by the broken lines, so that the impedance of the line is not changed with adjustment of bars 53 for changing the phasing.

A further short circuited transmission line section 57 may be arranged across line 52 for the purpose of matching the impedance of antenna 41 to the transmission line so as to prevent reflections thereof. The ratio of energization of radiators 46, 47 with respect to antenna 41 may be adjusted by sliding the connections of line 58 along the short circuited section 54. This adjustment should preferably be made so that the auxiliary radiators are energized with from 1/20 to 1/50 of the power furnished to radiator 41. The phase relationship of energization of radiators 46, 47 may be varied by sliding connection of the point of line 58 along the interconnecting conductors 59 so as to achieve the desired adjustment.

Another application of the principles of my invention is the adjustment of the radiation patterns of a guide course or localizer radio beacon. It can be readily appreciated that since the addition of a small amount of energy by an auxiliary antenna may produce sharp changes in the effective resultant radiation pattern, the phenomenon may be used to modify or sharpen the course indication of a course beacon.

A typical example of this is illustrated in Fig. 6. In this figure the two radiation patterns 60, 61 shown in light solid lines and light dash lines, respectively, represent the radiation diagrams on two sides of a course, as produced by a known radio beacon. By the use of auxiliary radiators spaced from the beacon the patterns may be modified into the form shown by the heavy solid lines and heavy dash lines at 62 and 63, respectively. It will be noted that the course defined by patterns 62, 63, is much sharper than that defined by patterns 60, 61, and furthermore, the signal on course is greater. Likewise, the patterns 62, 63 in general radiate less strongly in directions other than the course line and accordingly are less subject to reflection from objects spaced laterally of the course. Moreover, a saving of power results from the more favorable distribution.

In Fig. 7 is shown by way of example, a typical wiring diagram of a beacon system for producing patterns similar to 62, 43. An array of three radiators 70, 71, 72 produces the principal radiation pattern 60, 61. These radiators are fed from sources 73, 74 with energy $f$ modulated at frequencies $f_1$ and $f_2$ so as to produce the distinctive radiation diagrams. In place of separate sources 73, 74, a single source of supply and individual modulators may be used.

Energy from the sources is fed over a reentrant bridge network 75, or other suitable means so that radiator 70 is supplied with carrier modulated with both frequencies $f_1$, $f_2$, and the radiators 71, 72 are supplied with the side band energy only. Radiators 71, 72 are fed in phase opposition and in such relation that the side band frequencies $f \pm f_1$, $f \pm f_2$ are substantially in 180° phase radiation. The spacing between radiators 71, 72 and 70 is preferably made between 160°–175° electrically. Such a system produces a radiation pattern defining a two course beacon as shown in Fig. 6.

Spaced on either side of the main radiator array are provided auxiliary radiator systems 77, 78. These systems have been shown as arrays of two radiators by way of example. It should be understood, however, that a single radiator or any desired number may be used as desired. Energy is supplied to radiators 77, 78 over lines 79, 80, filters 81, 82 and branch sections 83, 84 from sources 73, 74, respectively. The amount of power supplied to radiators 77, 78 is regulated by adjustment of the connection point of lines 79, 80 with sections 83, 84 and the phase of the energy is controlled by phase shifters 81, 82, which may be made of shiftable line sections, as shown in Fig. 5. By controlling the phasing and magnitude of the energy relative to the main radiators the form and distribution of the radiation patterns may be regulated, as explained in connection with Fig. 1. In this manner the beacon course may be readily controlled.

The auxiliary radiators are preferably spaced a distance in the order of from 1 to 10 wavelengths from the main radiator, the greatest spacing tending to increase the sharpness of the course produced. The power supplied to the auxiliary radiators is preferably small with respect to that supplied to the main radiator. Although, as shown, the auxiliary radiators are symmetrically arranged with respect to the main beacon system, it is clear that departures from symmetry may be made if desired.

While, as shown, the course beacon is of the type wherein the patterns on both sides of the course line are produced simultaneously, it is clear that the same principles apply to beacons of the alternately keyed type as well. Furthermore, any shape radiation pattern may be used as the principal radiation. In the beacon system illustrated the normal sharpness of the system without the auxiliary radiators may be made quite high producing a change of 2.28 db. for 1.5° departure from course. However, by use of the auxiliary radiators the sensitivity or sharpness of the course may be increased to produce a charge of 9 or 10 db. per 1.5° departure from the course.

While in Figs. 5 and 7 the antenna units have been shown as horizontally polarizing loops, it should be distinctly understood that any type of radiator desired may be used. Vertical dipoles will produce substantially the same type of radiation pattern having a polarization in the vertical plane instead of the horizontally polarized energy produced in the system shown in Figs. 5 and 7. Furthermore, the arrangements as described are not limited to systems for producing radiation patterns of the shape shown by way of example in the present application. It is clear that the desired ratio of energy may be achieved by the use of other directive patterns. Accordingly, the principal radiator may produce a different form of radiation pattern if desired and a corresponding variation may be made in the shape of a radiation pattern from the auxiliary radiator to achieve the desired resultant distribution.

Furthermore, while I have disclosed particular applications of my system for the purpose of producing a glide path beacon, and localizer or course beacons, it is clear that the broad principles outlined may be utilized for achieving other desired results, such as changes in beacon patterns or the reduction of radiation in any desired directions so as to reduce troubles by reflections.

While I have described certain preferred forms of my invention it should be distinctly understood that these are included merely by way of illustration. What I consider to be my invention and desire to protect in this patent application is defined in the accompanying claims.

What I claim is:

1. The method of producing a desired resultant directive radiation pattern for radio beacons which comprises radiating a given amount of energy to produce a directive radiation pattern having a given center of radiation, superposing on said produced radiation pattern a modifying wave by radiating a smaller amount of energy in the order of from one tenth to one fiftieth of said given amount of energy forming a radiation pattern having a center or radiation displaced with respect to said given center of radiation a distance of several wavelengths at the operating frequency, and variably adjusting the phase relation of said produced patterns to produce the directional desired characteristics of said resultant radiation pattern.

2. A system for producing a resultant radiation pattern having a large change of power with relatively small angular direction change over at least a portion thereof for use as a radio beacon comprising a first directive radiator means, means for directly energizing said first radiator means at a given frequency with a given power to produce a first directive radiation pattern, a second radiator means having a differently shaped radiation pattern than said first pattern and spaced from said first radiator means a distance in the order of several wavelengths at said given frequency, and means for directly energizing said second radiator means at said given frequency and with a power in the order of one tenth to one fiftieth of said given power to produce a second radiation pattern, said first and second pattern producing by superposition a modified resultant radiation pattern having the desired direction characteristics.

3. A radio beacon system comprising a first radiating means for producing a directional radiation pattern, a second radiating means spaced a predetermined distance in the order of several wavelengths from said first radiator for producing a pattern of different directional characteristics from that produced by said first means, means for supplying energy of a predetermined frequency to both said radiating means, means for limiting the energy fed to said second radiating means to a value less than one tenth that fed to said first radiating means, and means for adjusting the relative phase of the energy fed to said radiators, whereby a resultant radiation pattern of the desired sharpness may be produced by the superposition of the radiations from said first and second radiating means.

4. A radio beacon according to claim 3 further comprising means for adjustably varying the amount of energy fed to said second radiating means.

5. A system for landing aircraft, comprising means for guiding an aircraft in a predetermined line, a first radiating means offset from said predetermined line for producing a directive radiation pattern overlapping said predetermined line, means for energizing said first radiation means at a given energy level to produce a predetermined signal intensity in a vertical plane and in the horizontal plane, a second radiating means offset from said line for producing a radiation pattern differing from said first pattern in directional characteristics and spaced at least several wavelengths from said first radiating means, means for energizing said second radiating means at the same frequency as said first radiating means and at an energy level less than said predetermined level to produce a modification of the field intensity of said first radiation pattern along said predetermined line to form a different resultant pattern to produce a desired landing curve.

6. A system for landing aircraft, comprising means for guiding an aircraft in a predetermined line, a first radiating means offset from said predetermined line for producing a radiation pattern overlapping said predetermined line and having a predetermined signal intensity in a vertical plane, a second radiating means offset from said line and spaced at least several wavelengths from said first radiating means and operating at the same frequency as said first radiating means and directed to produce a modification of the field intensity of said first radiation pattern along said predetermined line to form a different resultant pattern, said first and second radiating means being formed to produce a pattern of such shape that a desired curve of landing is produced, said first radiating means comprising a central fed radiator and spaced parasitic radiators to produce a desired radiation pattern, and said second radiating means comprising a pair of spaced radiators energized in phase coincidence to produce a different radiation pattern.

7. A system according to claim 5 wherein said first radiating means comprises a central fed radiator and spaced parasitic radiators to produce a desired radiation pattern, and said second radiating means comprises a pair of spaced radiators energized in phase coincidence to produce a different radiation pattern.

8. A glide path beacon of the constant intensity type for guiding aircraft to a landing point on a runway comprising a radiating system for producing a resultant field along said runway in the form of a substantially straight constant intensity line substantially coplanar with the runway, from a first point distant from the landing point to a second point relatively adjacent to the landing point and turning from said second point toward the line of the runway, said radiating means comprising a main radiator offset from the runway on a straight line which makes an angle of between 30° and 60° with the runway and having a radiation pattern with a maximum intensity of radiation directed substantially parallel to the runway, and an auxiliary radiator spaced a plurality of wave lengths from the main radiator and located on the side of said main radiator remote from the runway and substantially on said straight line, said auxiliary radiator radiating less power than the main radiator.

9. A radio beacon comprising an array of main radiators arranged to produce a directive radiation pattern, means for energizing said main radiators at a predetermined energy level to produce a guiding indication of predetermined sharpness, and means for modifying said beacon to vary said guiding indication, comprising an auxiliary radiator having different directive characteristics from said array and spaced at least several wavelengths from said main radiator array, and means for energizing said auxiliary radiator with energy of the same frequency as said main radiator and with an energy level less than one tenth of said predetermined energy level.

10. A radio beacon according to claim 9, wherein said means for energizing said auxiliary radiator comprises means for adjusting the power level between from one tenth to one fiftieth of said predetermined power level.

11. A radio beacon comprising, means for producing two radiation patterns of predetermined directive characteristics, said patterns overlying the desired course line and on opposite sides thereof to produce a guiding zone of equal signal intensities, means for imparting to the energy forming said patterns distinctive signal characteristics, and means for modifying said radiation patterns to alter said guiding zone comprising auxiliary radiating means spaced from said first named means at least several wavelengths at said operating frequency, means for supplying to said auxiliary means energy of the same frequency as that supplied to said first named means, and means for limiting the value of energy supplied to said auxiliary means to a value between one tenth and one fiftieth of that supplied to said first named means.

12. A radio beacon according to claim 11, further comprising adjustable phase shifting means for adjusting the phase relation of the energy supplied to said first named means and said auxiliary means.

ANDREW ALFORD.